Jan. 21, 1958     B. B. RUSSELL     2,820,459
BEAN AND PEA SHELLER
Filed Sept. 9, 1955     3 Sheets-Sheet 1
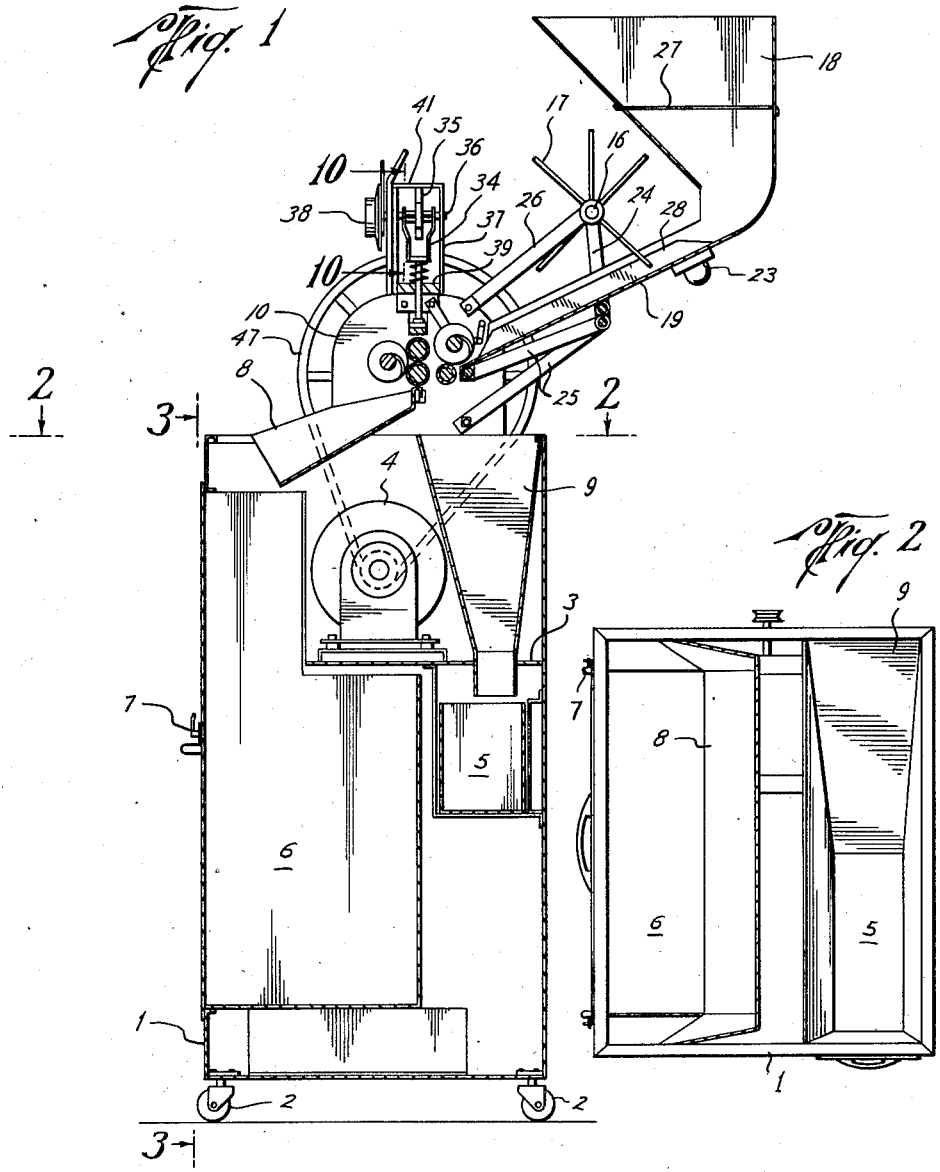
B. B. Russell
INVENTOR.
BY G C Helmig
ATTORNEY Jan. 21, 1958  B. B. RUSSELL  2,820,459
BEAN AND PEA SHELLER
Filed Sept. 9, 1955  3 Sheets-Sheet 2
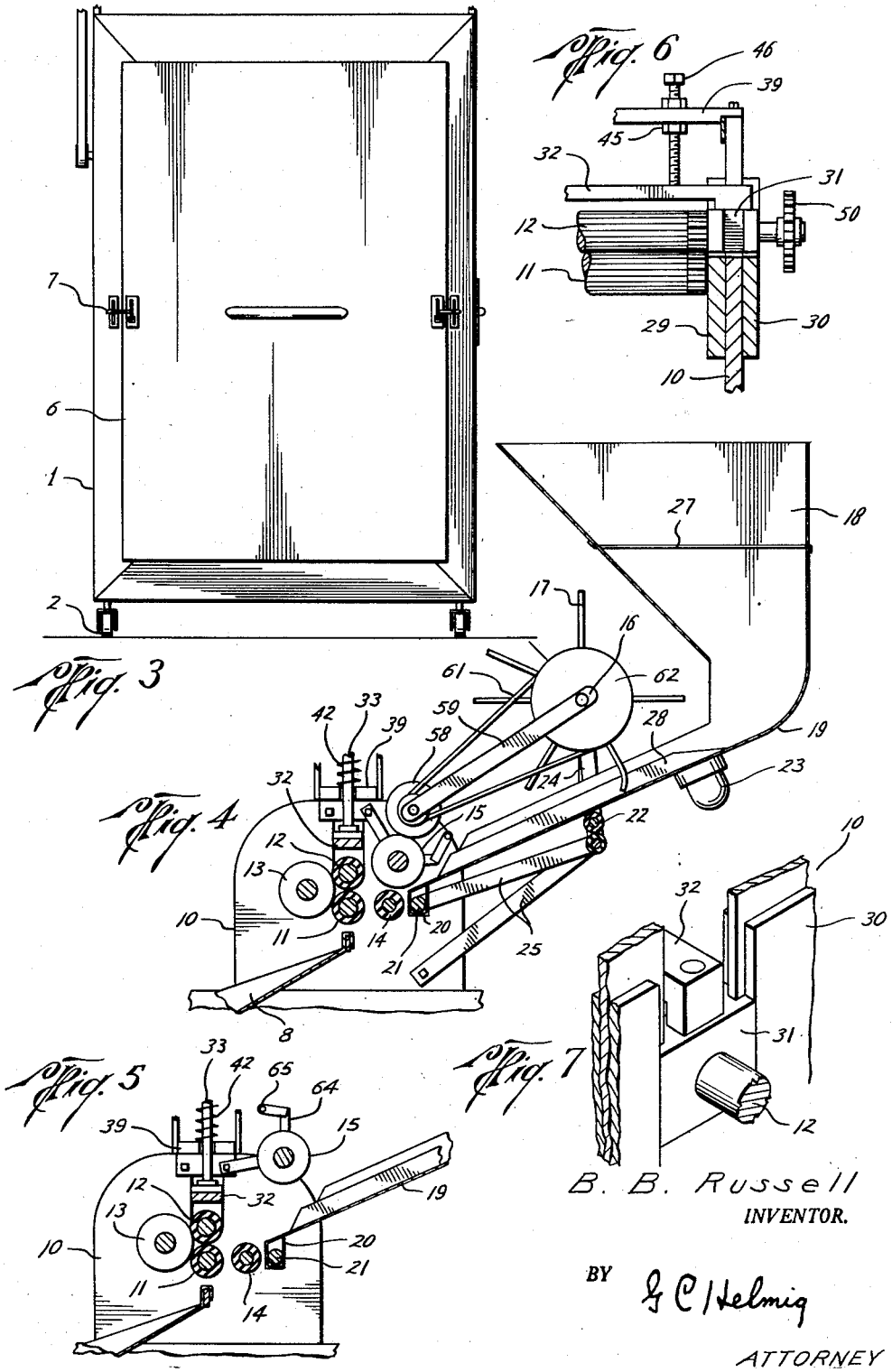
B. B. Russell
INVENTOR.
BY G. C. Helmig
ATTORNEY

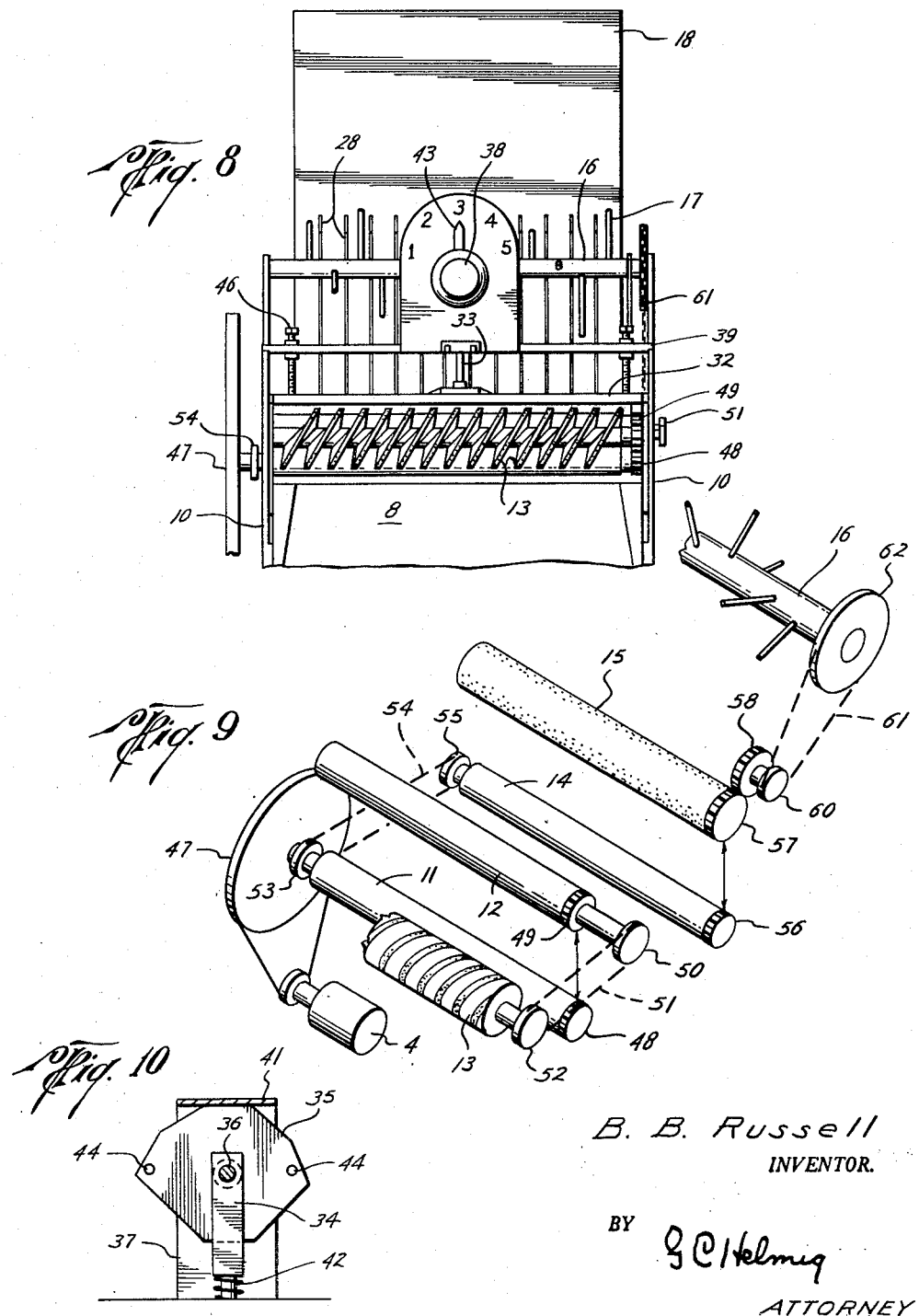

United States Patent Office 2,820,459
Patented Jan. 21, 1958

2,820,459

BEAN AND PEA SHELLER

Burrell B. Russell, Hearne, Tex.

Application September 9, 1955, Serial No. 533,319

8 Claims. (Cl. 130—30)

This invention has to do with a machine for stripping the meats or seeds from their protective husk or pod enclosures, and will have special utility in the separation of edible portions from the hulls of garden peas and beans. Such plant fruit grow as long envelopes having side edge seams and containing seeds along their lengths. As the seeds develop to maturity, they usually produce longitudinally spaced apart swells in the protective pod walls, which are pliable but tough, and eventually the weaker side seams crack open to free the ripened swollen seeds. Before that occurs, the practice is to pick the pods from the plant for marketing and table use and later cracking open the envelopes one at a time, and such manual shelling has been the customary practice for both small home needs and also large scale requirements of commercial packing plants. It is time consuming and tedious labor, which the machine here to be described is designed to eliminate. And by way of comparison, it may be stated that the shelling of one bushel of peas requires about four hours by hand but only about two minutes by machine. Furthermore, there is less wastage with machine shelling, and sanitation and cleanliness is more certain with the absence of personal handling of the food product.

An objection of the invention is to provide a machine for speedily and certainly separating the coarser and tougher hulls cleanly from the more delicate meats without mashing or injuring the whole kernels and to provide a machine which is universally adapted for successful use whether the seed pods are freshly picked and therefore soft and green and even small or, at the other extreme so as to be dry, hard, and large.

A further object of the invention is to provide a pair of co-operating pressure rolls which act on pods fed lengthwise between them to crack open the seed covering progressively as the soft edible mature seeds along the length of the pod successively approach the rolls for freeing or expressing the seeds in advance of the rolls and without, in most instances, breaking the pod adjacent smaller and immature seeds which, therefore, are retained in the pod and pass through the rolls for discard with the stripped hulls.

Another object of the invention is to provide an arrangement for keeping the pressure roll surfaces clean at all times by continuously wiping both of them during use by a single rotary bristle brush whose direction of rotation and position at the discharge side of the machine directs the separated pod hulls into a collecting bin. A somewhat similar rotary bristle brush co-operates with a feed roll at the entry side of the pressure rolls, both to keep the feed roll clean and to assist in advancing and guiding the pods moving lengthwise between the brush bristles into the space between the pressure rolls. To further assure the presentation of the oncoming pods lengthwise toward the pressure rolls, a downwardly extending feed tray leads from a supply hopper and is subdivided into a number of side by side narrow guideways or troughs, each of a width less than the length of a pod, and a series of rotatable fingers sweep through the troughs to deflect the oncoming pods into longitudinal alignment within the several narrow guide troughs and across the widths of the pressure rolls. All of the several rolls and brushes are preferably power driven from a common motor and have power transmitted to drive them in relative directions of rotation for properly effecting the feed and the separation of the pods.

Various other objects and advantages of the invention will become apparent during the course of the following specification having reference to the accompanying drawings wherein Fig. 1 is a vertical sectional view of the complete machine assembly built in accordance with a preferred but not necessarily the only embodiment of the invention; Fig. 2 is a top plan view of the main frame or supporting cabinet on which the operating mechanism is based, and the view is taken on line 2—2 of Fig. 1; Fig. 3 is a front elevation of the supporting cabinet; Fig. 4 is a vertical section showing the operating mechanism as in Fig. 1 but on a larger scale; Fig. 5 is a fragmentary view similar to Fig. 4 but showing the feed brush in an inoperative position for enabling access to the feed rolls for clean-out or other purposes; Fig. 6 is a transverse vertical section showing the work performing rolls and their mountings at one side of the machine; Fig. 7 is a perspective fragmentary view to illustrate the adjustable end mounting of the upper pressure roll; Fig. 8 is a front elevation of the upper part of the machine; Fig. 9 is a perspective exploded view of merely the several rotating roller mechanisms and the power drive therefor; Fig. 10 is a vertical transverse section of a fragment of the machine as on line 10—10 of Fig. 1; Fig. 11 is a fragmentary view on a large scale showing co-operating portions of the pressure rolls and a seed pod passing between the rolls.

The operating mechanism may be supported in a suitable frame of any character, and a convenient support will consist of a wheeled rectangular cabinet, indicated at 1 in the drawing. It can conveniently be formed with sheet metal side walls of convenient height which provide a boxlike enclosure mounted on wheels or casters 2. A horizontal partition 3 provides an upper compartment to house an electric drive motor 4. Below the partition 3 are slide supports for removable containers 5 and 6 in side by side relation. The smaller container 5 is slidably removable through a side opening of the cabinet and it receives the peas as they are separated from the pods. The larger container 6 is slidable through an end wall of the cabinet 1 and normally is held within the cabinet by means of latches 7 connecting its front wall as a door to the interior of the cabinet. It is arranged to receive the broken-open hulls and its removability is to enable the accumulated waste to be discarded from time to time. A guide chute 8 fixed in the top of the cabinet has its discharge end overlying the open top of the container 6 and leads downwardly from the discharge side of the pressure rollers. Another funnel or spout 9 is mounted in the top of the cabinet and leads to the receptacle 5 from the delivery side of the pressure rolls.

Extending upwardly from the cabinet and at the sides thereof are a pair of frame plates 10 for mounting the opposite ends of the several rolls. The rolls include a pair of work performing or pressure rolls 11 and 12 arranged in superposed co-operating relation; a cleaning bristle roll 13 whose transverse axis is in substantially horizontal alignment with the space between the pressure rolls and on the discharge side thereof; a pair of superposed feed rolls 14 and 15 (the latter having bristles) immediately adjacent the entry side of the pressure rolls and a rotary shaft 16 which has a number of radial studs on which are sleeved tubular rubber fingers 17 which on operation serve to straighten out the seed pods coming toward the pressure rolls. As viewed in the drawings, the pressure rolls 11 and 12 rotate in opposite directions, that of the lower roll 11 being a rotation in a counterclockwise direction and that of the upper roll 12 being a clockwise direction. The direction of the bristle brush 13 rotation is clockwise. The co-operating feed rolls 14 and 15 rotate counterclockwise and clockwise, respectively, and the straightening fingers 17 rotate counterclockwise. The several rolls are in side by side relation and are mounted in bearings at their opposite ends for rotation about parallel axes.

For co-operation with the rotating fingers 17 in feeding the material into the machine, there is provided a sheet metal feed hopper 18 opening at its bottom above a forwardly and downwardly inclined tray or chute 19 whose forward end terminates immediately beside the top of the lower feed roll 14 and is overlapped by the rotating bristles of the upper feed roll 15. A dependent eye 20 on the forward end of the guide chute 19 embraces or loosely receives a transverse rod 21 whose opposite ends are rigidly secured in the frame side plates 10. Additional connection and support for the feed hopper and chute is provided underneath the chute 19 in spaced relation to the connecting tie bar 21 by transversely extending rod 22 which, if desired, may be rubber coated for a resilient seat. An electric vibrator unit 23 can be mounted on the underside of the chute or tray 19 for shaking the loosely supported tray and hopper to assist in the downward feed of the seed pods.

Opposite ends of the supporting rod 22 pass through and are supported by a pair of upwardly extending side links 24 whose lower ends are secured each to the overlapping portions of a pair of forwardly diverging supports 25 whose forward widely spaced apart ends are secured by welding or bolting to an adjoining side plate 10. The upper end of each supporting link 24 is located and braced by a tie bar 26 connected to the top of the side plate 10, as best seen in Fig. 1, and the adjoining upper ends of the links 24 and 26 provide the pivotal support for the rotating shaft 16.

Intermediate the top and bottom of the hopper 18 are one or more spaced bridging wires 27 which when the seed pods are placed in the bin will tend, upon engagement of the pods, to swing them around so that their longitudinal or major axis is toward the direction of feed. The wires also help distribute the incoming pods across the hopper in the direction of the machine for a distribution of the feed throughout the length of the working rolls. The top of the inclined tray 19 from a point at the bottom of the hopper 18 on down to the forward discharge end of the tray is provided on its upper side with a series of parallel vertical partitions 28 which subdivide the tray into a series of side by side narrow troughs, as best seen in Fig. 8. The width of the troughs should be somewhat in excess of the transverse dimension of the seed pod, but in any event should be less than the longitudinal seed pod dimension so that the pods slide down the chute in the direction of their lengths. The several rotating arms 17 are preferably of the same number as the number of chutes and are arranged to sweep into and out of the chutes or guideways to assist in maintaining the longitudinal alignment of the seed pods, and particularly to deflect into a straight position those pods which are out of alignment.

As the pods travel down the inclined tray, they eventually will come into engagement with the bristle feed wheel 15 and be swept forward, usually between the bristles, to be maintained frictionally for forward travel in the direction of their length. As they pass from support by the tray, they will engage and be supported and fed forward by the lowermost feed wheel, whose diameter and rate of rotation substantially correspond with that of the working rolls so that its peripheral speed is like that of the work rollers 11 and 12. The axis of the feed roll 14 is in substantial horizontal alignment with the axis of the roll 11, and the peripheral surfaces of these two rolls are spaced apart a distance considerably less than the length of the seed pods but sufficient to enable loosened seeds to drop downwardly between the rolls and into the discharge chute 9 leading to the receptacle 5.

By reference to Fig. 11, it will be noted that the work performing or pressure rollers 11 and 12 may each be constituted by a metal core with a surface lining of rubber or other similar material. Preferably, the lower feed roll 14 is of like construction. A pliable tough hard rubber somewhat on the order of that used for the tread of automobile tires, or even slightly harder, if suitable, and the coating annulus may be molded with stiffener cord fabric in the rubber or it can be extruded tubing to be sleeved on and vulcanized or cemented to the surface of the metal core.

There is contemplated a roughened or corrugated working tread surface to provide axially extending ribs and valleys for a pressure concentration and traction engagement with the traveling seed pods. For rolls of about one and three-sixteenths inch diameter and on the order of twenty inches long, the surface ridges and depressions can be on the order of one-sixteenth of an inch wide and deep so as to provide a circumferential succession of closely spaced shallow relief in the tread surface.

The space between adjacent surfaces of the pressure rolls 11 and 12 should be somewhat less than pod thickness and adjustment of the spacing between the parallel rolls will ordinarily range between 0.003 and 0.020 of an inch for a range of seed pods, for example, from small wet fresh peas to large dry beans. The tips of the seed pods are thick and solid, and as the oncoming pod moves between the pressure rolls the leading tip is usually mashed or squeezed enough to start a tear along the side seam of the longitudinally moving body, and as the first swell containing a kernel comes into the region of the squeezing pressure, the progressive cracking of the seam opens up the swell for some distance in advance of the rolls and the start of the squeezing pressure on the side walls of the pod will pop out the seed before the seed is subjected to any mashing pressure. The popped-out seeds then drop down through the intervening passage or space ahead of the pressure rolls and between the lowermost pressure roll 11 and feed roll 14, for collection in the receptacle 5, and the pod continues through the rolls with a progressive splitting and the popping out of the succession of seeds as they advance toward the pressure region. Immature seeds are likely to be bound within the pod so as not to pop out, but pass on beyond the rolls and drop with the opened pods on the discharge side of the roll into the chute 8 leading to the refuse collecting chamber 6. Those portions moving beyond the discharge side of the rolls 11 and 12 come into engagement with the rotary brush 13 and are swept downwardly at the same time that the bristles are sweeping over and removing any debris from the pressure roll ribbed surfaces. Since these surfaces are continually being swept clean, there is no clogging of the roughened roll surfaces, nor is there any vegetable matter left on the rolls to decay and contaminate the rolls. It may be mentioned that the bristles preferably are formed of nylon, which not only provides an effective and long wearing brush but also has practically no tendency to absorb vegetable juices.

The lowermost pressure roller 11 has its opposite ends rotatably mounted in fixed bearings of the side plates 10, and the plates in the mounting area are preferably reinforced by inner and outer plates 29 and 30, as best shown in Figs. 6 and 7. At their upper ends each frame plate 10 is formed with a vertical slot (see Fig. 7), and the side plates 29 and 30 likewise are formed with similar slots which are slightly wider than the slot in the plate 10, and the slot edges co-operate in affording slide guides for keyways in a vertically adjustable slide bearing block 31 positioned in the frame plate slot for an adjacent end of the upper roll 12. The two side bearing blocks 31 are bolted or otherwise fixed to the opposite ends of a pressure bar 32 of inverted U-shape. In the central region of the pressure bar 32, it has welded to it an upwardly extended stud 33 which terminates in forked arms 34 which straddle a cam plate 35 and rotatably receive a rock shaft 36 which is fixed to the cam plate 35 and extends through vertically elongated slots in spaced side walls 37 and carries a hand knob 38 at the front of the machine. The side walls 37 are fixed at their lower ends to the opposite sides of a bridging bar 39 whose opposite ends are bolted to the upper portions of the two side plates 10. At their upper ends the spaced plates 37 are joined by a crossbar 41 which forms an abutment stop for any one of five flats on the cam plate 35. A coiled compression spring 42 surrounds the stud 33 and seats at opposite ends of the bridging bar 39 and the forked shoulder of the stud 33 to exert an upward biasing force and yieldably maintain a selected cam flat in seated engagement with the fixed abutment 41. The hand knob 38 carries a pointer 43 for cooperation with the scale marked to correspond with the number of cam flats. When the hand knob 38 is rotated, it rocks the cam 35 for selecting one of the cam flats to engage the abutment seat 41. Limit pins 44 adjacent the endmost cam flats will engage one or the other side of the fork 34 to confine the range of rocking movement. Since each flat in succession is at a different radial distance from the pivot pin 36, the setting of the manual knob will vary the height of the slide bearings 31 and the upper roller, and, therefore, the space between the pressure working rollers. As seen in Figs. 6 and 8, the bridging bar 39 near its opposite ends carries screw threaded nuts 45 to receive adjustable set screws 46, whose lower ends act as limit stops for abutment with one or the other end of the roll support bar 32. Adjustment of these spaced apart set screws 46 in relation to a selected setting of the cam plate 35 enables the screws to co-operate with the cam abutment bar 41 in locating and limiting upward movement of the upper roll assembly whose suspension is by the compression coil spring 42 as guided by the slide bearing blocks 31 and the vertically elongated slots in the side walls 37 into which the opposite ends of the rock shaft 36 slidably extend. Because of the loose sliding fit of the blocks 31 and the shaft 36 and the inherent flexibility of the roll support bar 32 and its associated parts, a slight tilting within the limits afforded by the adjusted set screws 46 may occur about the axis of the rock shaft 36 and thereby permit one or the other end of the roll 12 to rise for the passage of stones or other solids carried with the field crop between the pressure rolls. Temporary separation of the roll affords a safety measure to minimize damage and stoppage of the operating mechanism.

The drive mechanisms for the several rotating parts can be best seen in Fig. 9. The motor 4 is belted to a pulley 47 on the shaft of the lower work roller 11. At the opposite end of this shaft there is a spur gear 48 in mesh with a like gear 49 fixed to the shaft of the upper roll 12. The range of relative adjustment of the rolls 11 and 12 is such that the gear teeth will remain in engagement at all times. These gears, therefore, operate in opposite directions and their speed of rotation is on the order of 219 R. P. M. The shaft for the roller 12 also carries a chain sprocket 50 on which is entrained a chain 51 engaging a drive sprocket 52 for the cleaning brush 13 having bearings at opposite ends in the plates 10. On the far end of the shaft for the roll 11, as seen in Fig. 9, a chain sprocket 53 is engaged by a chain 54 which drives a sprocket 55 fixed on the shaft for the rubber covered feed roll 14. Both the brush 13 and the feed roll 14 are driven at the same speed as the pressure rollers. At the near end of the roller shaft 14, it carries a gear 56 in mesh with a larger diameter gear 57 to drive the feed brush 15. This gear 57 meshes with a gear 58 whose shaft is mounted in the end of a swinging lever 59 (see Fig. 4) whose opposite end is fulcrumed on the drive shaft 16. The shaft for the gear 58 has a sprocket engaging a chain 61 to drive a larger sprocket 62 keyed to the shaft 16 for a drive at reduced ratio. Thus the fingers 17 rotate at a relatively slow speed and avoid injury to the seed pods being fed past them. The weight of the gear 58 on the end of the swinging lever 59 keeps it in drive engagement with the gear 57. It can, however, be swung upwardly about the fulcrum connection with the link 59 to an inoperative position. In this connection, it will be noted from Figs. 4 and 5 that the feed brush 15 has its opposite ends rotatably mounted on a pair of levers 64, each pivoted at an end to the side frames 10. Its gravity weight will keep the drive gear 57 in driving mesh with the companion gear 56. At their free ends the levers 64 are interconnected by a handle 65 so that after the link 59 is swung upwardly out of the way the levers 64 can also be swung upwardly, thereby lifting the feed brush 15 to a raised position, as seen in Fig. 5, to facilitate inspection of the parts and the cleaning out of any accumulation of misguided seed pods.

The machine as described is especially adapted for shelling peas and beans on a large scale, as, for example, in the wholesale and retail trade. It will also serve the needs of canneries and deep freeze packing plants. Manual attention for filling the feed hopper and emptying the two collector boxes can be eliminated for complete automaticity by the addition of continuous conveyors, one to bring the unshelled pods to the feed mechanism, another to carry away the kernels as they are separated, and a third conveyor to dispose of the hull refuse. For home and other small usage, a more compact and hand operated version of the machine would involve the same arrangement of pressure rolls of somewhat shorter length and a pod guide feeder with a supporting frame having a flat base to be clamped conveniently to a kitchen table top and with a hand crank for turning the stripping rolls.

While the foregoing description has referred merely to the preferred embodiment, it will be understood that the structure is capable of various modifications without departing from the invention as set forth in the attached claims.

What is claimed is:

1. In a seed pod sheller, a support, a pair of oppositely rotatable seed expressing pressure rolls carried by the support, a feed tray leading toward said rolls and ending short thereof to provide a drop passage for expressed seeds, transversely spaced apart upstanding dividers on the upper face of said tray for guiding the seed pods in the direction of their longitudinal extent, a rotary shaft mounted by the support above said tray and provided with a series of outwardly extending pod engaging fingers of lengths to dip into the tray spaces below the upper edges of said dividers, drive means rotating said shaft for sweeping the tips of said fingers in a direction away from said rolls, a rotatable feed roll occupying a part of said drop passage and located at the discharge end of said feed tray and away from the pressure rolls a distance less than the length of seed pods, means to rotate said feed roll in a direction to propel pods across said drop space and between said pressure rolls, said feed roll being driven by said feed roll rotating means at substantially the same peripheral speed as that of the pressure rolls, a flexible bristle roll mounted by the support with the tips of the bristles in overlapping wiping relation with the feed roll and with the tray at the discharge end of the tray and a drive transmitting connection for rotating said bristle roll in counter direction to said feed roll, both to cooperate with the tray in pod reception between adjoining bristle tips for guiding the advance of the pods in the direction of their longitudinal extent and concurrently to brush said bristle tips against the feed roll surface.

2. In a seed pod sheller, a pair of co-operating pressure rolls to receive pods and express seeds therefrom, a downwardly inclined feed tray leading toward said rolls and having side by side narrow chutes to guide the pods longitudinally thereof, deflectable and rotatable fingers arranged to sweep in the opposite direction to the advance of pods and into the several side by side narrow chutes to straighten the pods therein and shaker means connected with the tray to vibrate the same and assist gravity feed of the pods therein.

3. A seed pod sheller, including a support, side by side drop collectors in the support for receiving separated seeds and pod hulls, a pair of co-operating pressure rolls carried by the support above and between said collectors with the hull discharge side of the rolls above one collector and the seed expressing side above the other collector, a roll contacting cleaning brush mounted in the support directly in the path of hulls discharged from said rolls and on an axis substantially equidistant from the axis of both rolls for rotation in cleaning contact with both rolls, means to rotate said brush in the same direction as the uppermost of said rolls for deflecting discharged hulls toward the collector, a pair of co-operating feed rolls mounted in the support at the seed expressing side of the rolls for rotation in directions to lead seed pods to the pressure rolls and spaced from the pressure rolls to provide therebetween a drop passage for expressed seeds leading to the seed collector, an inclined feed tray terminating adjacent said feed rolls and having a number of guideways each of a width smaller than the lengths of the seed pods and a series of rotating fingers arranged to sweep into the guideways and deflect seed pods into longitudinally extending feed positions within said guideways.

4. In a pea shelling machine, a pair of co-operating work rolls to receive and exert opening pressure on pea shells passed therebetween, a single rotary bristle brush mounted on an axis aligned with the shell receiving space between the rolls and with its bristle tips in sweeping abutment with both rolls on the discharge side thereof, means to rotate said brush in a direction that its bristles sweep downwardly across said rolls and receive between them and carry downwardly the shells discharged from said rolls and a pair of co-operating feed rolls mounted ahead of the working rolls for rotation in opposite directions and at different peripheral speeds to advance and guide pea shells in the direction of their length toward the working rolls, one of said feed rolls being a bristle brush whose bristle tips are in sweeping engagement with the other feed roll.

5. In a pea shelling machine, a pair of co-operating pressure rolls, a main frame mounting one of said rolls, a frame carried adjustment bar of inverted U-shape whose dependent legs provide bearings for the other of said rolls and are slidably keyed to the frame, a suspension pin extending upwardly from the central region of the crossmember of said adjustment bar, a coil compression spring surrounding said suspension pin and engaged at opposite ends with the frame and with the pin to yieldably suspend said adjustment bar and the pressure roll borne thereby and a manually operated rotary cam interposed between the frame and said suspension pin and operable to change the spaced relation between said pressure rolls selectively in opposition to the elastic force exerted by said coil spring.

6. The structure of claim 5 wherein said cam includes a pivoted plate having a circumferential succession of flat faces each at a different distance from the pivot axis of the plate and a handle for rotating said plate to bring the flat faces selectively into seating abutment with a co-operating portion of the frame.

7. In a pea shelling machine, a main frame, a pair of pressure rolls mounted on the frame, a frame supported feed tray leading toward but ending short of said pressure rolls, a first feed roll mounted by the frame on a fixed axis within the space between the delivery end of the feed tray and the pressure rolls, a second feed roll superposed above the first feed roll for co-operation therewith, a swinging lever pivoted on the frame and formed at its free end with a bearing for the second roll whereby said roll can be swung from a lowered position upwardly away from the tray and out of the oncoming feed path of pea shells, and roll drive means including mating gears at adjoining ends of both feed rolls for meshing engagement when the second feed roll is in its lower position.

8. In a pea shelling machine as described in claim 7, a rotor having pea shell deflecting fingers and being mounted by the frame on a fixed axis for finger co-operation with the tray, means to drive said rotor from the gear on the second feed roll and in a direction opposite to the direction of rotation of said second feed roll, said drive means including a driven pulley fixed with the rotor, a drive pulley and a driving gear therefor for meshing engagement of said feed roll gear, an endless drive member entrained on said pulleys and a swinging lever fulcrumed at one end on the axis of the rotor and rotatably mounting at its free end said drive pulley and driving gear, said swinging lever enabling its free end to be swung upwardly to disengage the rotor drive and to clear the swinging path of the gear on the second roll when the latter is to be raised or lowered.

References Cited in the file of this patent

UNITED STATES PATENTS

| 53,956 | Cutting | Apr. 17, 1866 |
| 302,515 | Molini | July 22, 1884 |
| 437,987 | Harbin | Oct. 7, 1890 |
| 466,021 | Olney et al. | Dec. 29, 1891 |
| 858,608 | Krmpotic | July 2, 1907 |
| 885,881 | Steckel | Apr. 28, 1908 |

FOREIGN PATENTS

| 13,496 | Great Britain | 1914 |